Aug. 16, 1966  C. D. BOADLE  3,266,585
ELECTRICAL WEIGHING APPARATUS
Filed Feb. 8, 1965  3 Sheets-Sheet 3
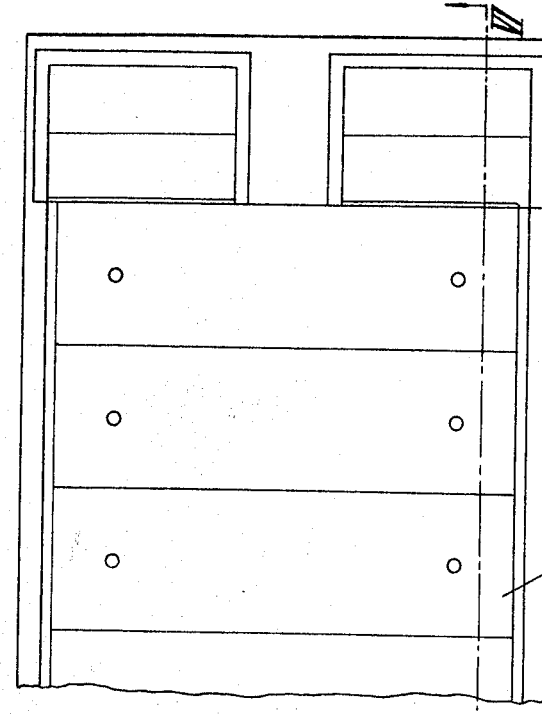
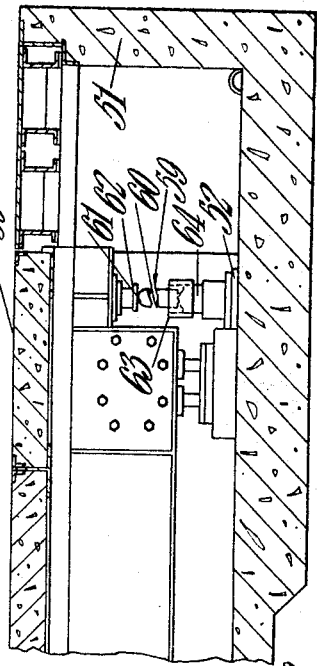
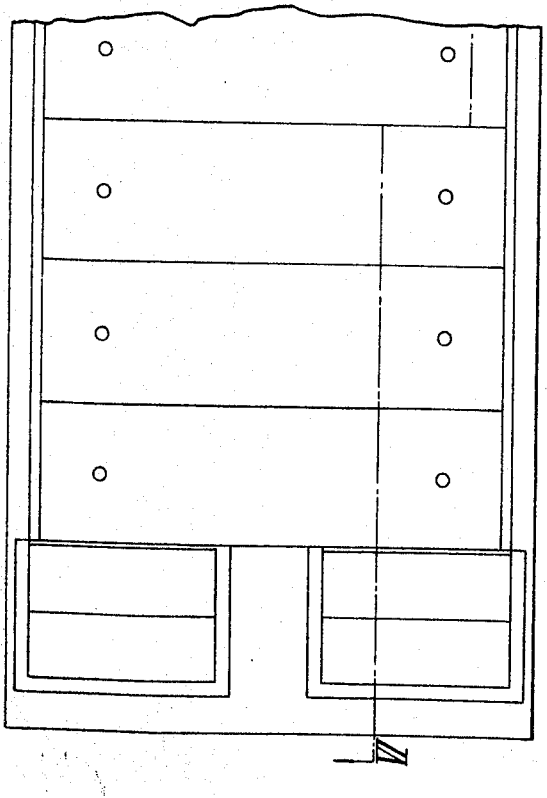
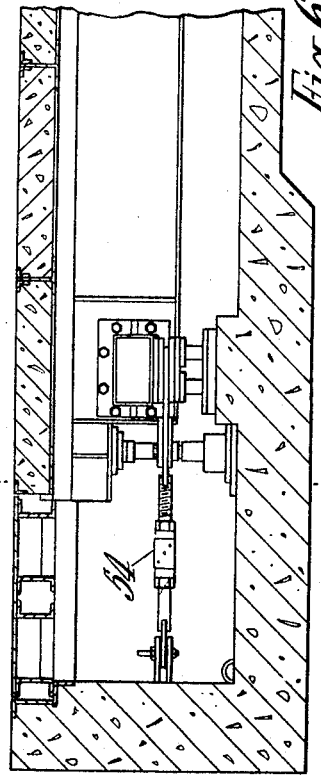

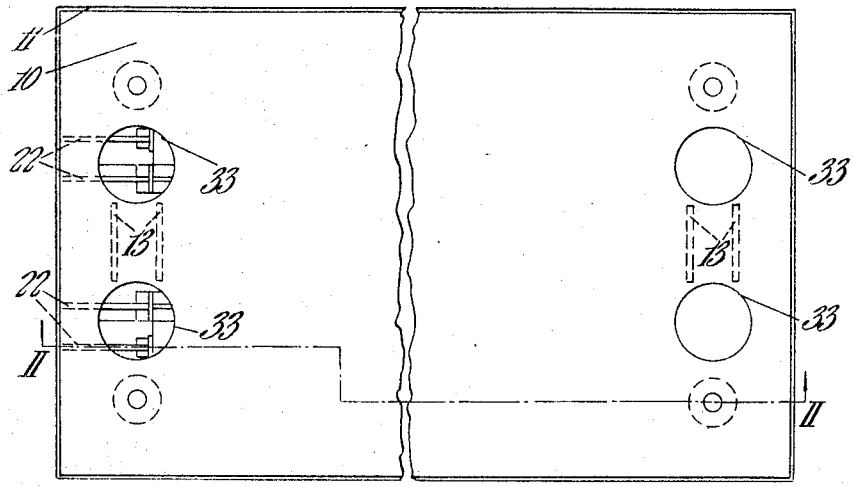
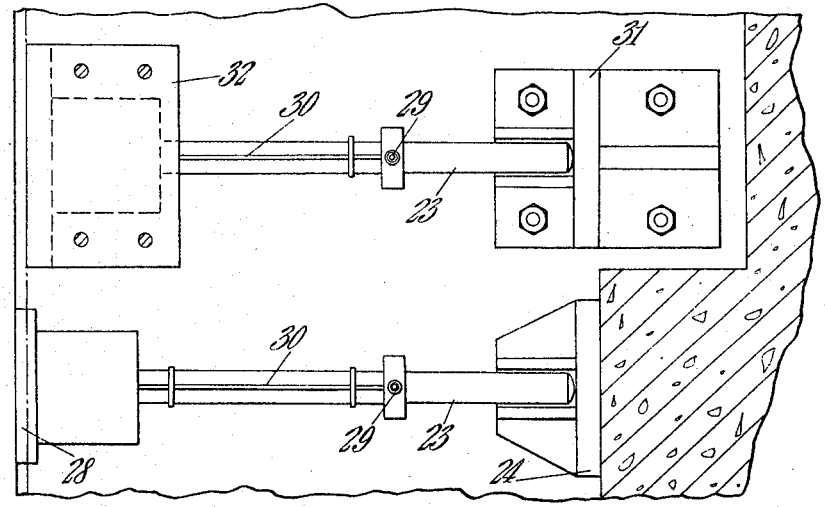
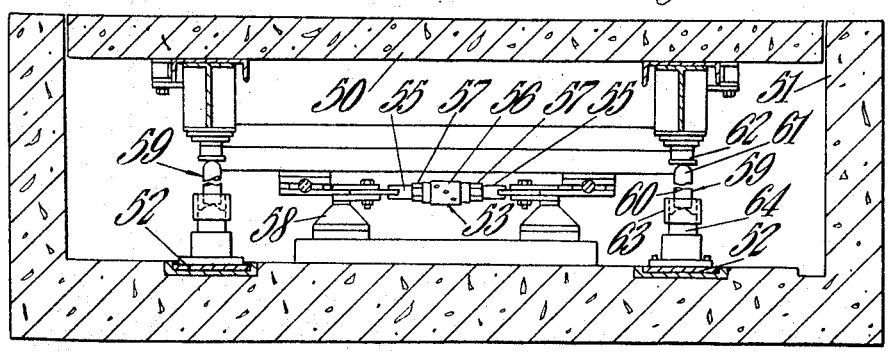

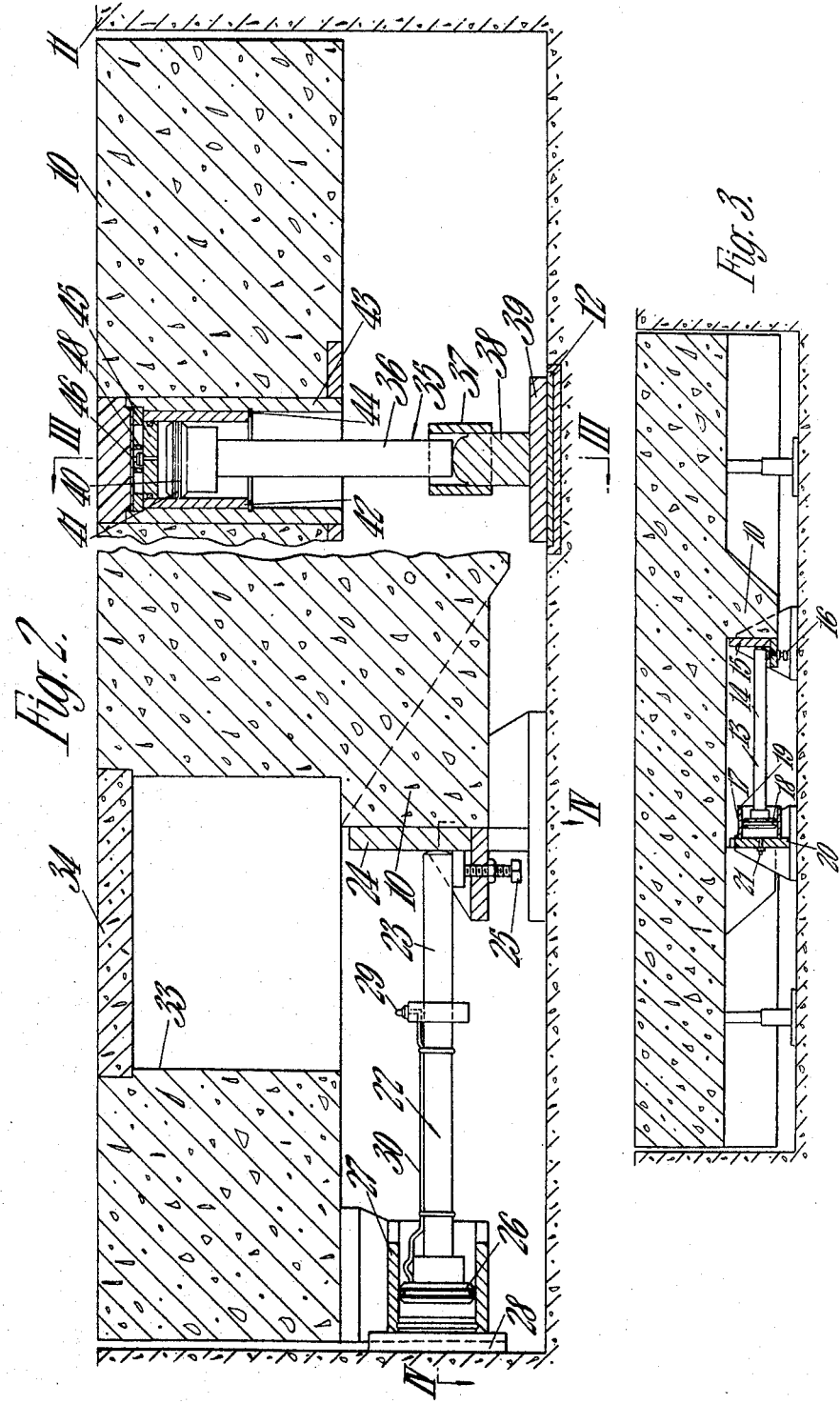

United States Patent Office 3,266,585
Patented August 16, 1966

3,266,585
ELECTRICAL WEIGHING APPARATUS
Campbell Dean Boadle, Caerleon, England, assignor to Girling Limited, Tyseley, Birmingham, England
Filed Feb. 8, 1965, Ser. No. 431,139
Claims priority, application Great Britain, Feb. 24, 1964, 7,538/64
5 Claims. (Cl. 177—154)

This invention relates to electrical weighing apparatus of the kind including a load carrying member for a load to be weighed, and at least one load cell on which the member is supported for providing an electrical signal related to the magnitude of a load on the member.

The primary object of the present invention is to provide electrical weighing apparatus of the kind specified, in a convenient form.

According to the primary aspect of the invention electrical weighing apparatus of the kind specified has means acting between the load carrying member and relatively fixed structure for the member, said means comprising members for respectively restraining horizontal movement of the member relatively to the fixed structure in two mutually transverse directions, the member or members for restraining in one of the directions being disposed at or near one of the load carrying member, so that relative horizontal expansion of the member is permitted, and means whereby relative horizontal movement between the member and the or all of the load cells can take place.

According to a further aspect, the invention resides in apparatus for transmitting loads to the top of a load cell, said apparatus comprising a strut engaged with the load cell at its lower end, and engaged at its upper end with a member, the load of which is to be transmitted to the load cell, the arrangement being such that horizontal movement of the member relatively to the load cell is permitted, by sliding contact between the strut and the member and/or the load cells or parts secured thereto.

Specific examples of the invention are shown in the accompanying drawings in which:

FIGURE 1 is a plan view of a first form of weighbridge in accordance with the invention, FIGURE 2 is a cross-sectional side elevation view on the line II—II in FIGURE 1, on an enlarged scale, FIGURE 3 is a cross-sectional end elevation view on the line III—III in FIGURE 2, on an enlarged scale, FIGURE 4 is a fragmentary cross-sectional plan view on the line IV—IV in FIGURE 2, FIGURE 5 is a plan view of a modified form of weighbridge, FIGURE 6 is a cross-sectional side elevation view on the line VI—VI in FIGURE 5, and FIGURE 7 is a cross-sectional end elevation view on the line VII—VII in FIGURE 6.

The weighbridge shown in FIGURES 1 to 4 comprises a rectangular concrete platform 10 supported in a concrete lined pit 11 with its top surface level with the upper edges of the pit, the platform being supported upon four load cells 12 respectively situated near the corners of the platform, these load cells being of any conventional form.

To prevent horizontal movement of the platform 10 relatively to the pit 11 in each of two mutually transverse directions, there are restraining members 13 and 22. The restraining members 13 for preventing movement transversely of the length of the platform are in pairs to act in opposite directions, one such pair being disposed at each end of the platform near its longitudinal center line. An individual member is shown in FIGURE 3 and comprises a rod 14 having a part-spherical end engaging in a bracket 15 on the platform 10, to perform movement of the part-spherical end in a vertical direction, within the bracket 15, and adjusting screw 16 is provided, the purpose of this being to align the rod 14 so that its axis lies horizontally. The opposite end of the rod 14 carries a piston 17 having a sealing ring 18, this piston 17 being engaged in a cylinder 19 formed on a support bracket 20 fixed to the floor of the pit 11. The space between the closed end of the cylinder 19 and the piston 17 is filled with an hydraulic fluid such as grease which is fed to the space through a nipple 21, grease being fed in to adjust the effective length of the restraining member 13. Each pair of members 13 is arranged with individual pistons 17 extending in opposite directions.

The restraining members 22 for preventing movement longitudinally of the platform are provided at or near one end only and are shown in FIGURES 2 and 4 in side elevation and in plan respectively. Each member 22 comprises a rod 23 having a part-spherical end portion engaged, in the case of the member shown in FIGURE 2, in a bracket 24 on the platform 10, having an adjusting screw 25. As in the case of the rod 14 there is a piston 26 in a cylinder 27 which is formed in a bracket 28 fixed, in the case of the bracket shown in FIGURE 2, to the wall of the pit 11. Grease is fed to the space between the closed end of the cylinder 27 and the piston 26 through a nipple 29 and pipe 30, the former being supported on the rod 23. The members 22 are mounted in pairs, one being engaged between the bracket 24 on the platform and the bracket 28 on the pit wall, whilst the other of the pair has its part-spherical end portion engaged in a bracket 31 fixed to the pit floor its piston engaged in a cylinder formed in a bracket 32 on the platform.

Access to the grease nipples and also to the adjusting screws 16 and 25 is gained through man-holes 33 having detachable covers 34 (omitted in FIGURE 1). It will be seen that the pistons permit some misalignment of the respective axes of the rod and of the cylinder.

The platform 10 is supported on the four load cells, through the intermediary of respective struts 35, one of which is shown in FIGURE 2. This strut comprises a vertically mounted rod 36 which, at its lower end, is flat or slightly domed and is engaged within a sleeve 37 and rests on a domed upper end portion of a block 38. The block 38 has a pad 39 fixed to it which engages with the upper surface of the appropriate load cell 12.

The upper end of the rod 36 carries a piston 40 having a sealing ring 41. The piston engages in a cylindrical sleeve 42 which is, in turn, mounted in a tube 43 which is embedded in the concrete of the platform 10, the sleeve 42 being held in place by a circlip 44. The end of the cylinder is closed by a cap 45 in which is a nipple 46 for the supply of grease to the space between the piston 40 and cylinder 42. This nipple 46 is accessible through an opening in the upper surface of the platform 10 which is normally filled with a plug 47 of a bituminous material, a metal cover plate 48 being provided to prevent contact of this material with the nipple 46.

With this arrangement of weighbridge, it will be apparent that movements in a horizontal plane are restrained by the members 13 and 22, but since the members 22 are only provided at one end of the platform, expansion of the platform in a longitudinal direction can take place as a result, for example, of temperature changes, though such movements are unrelated to the movement of loads to be weighed on the platform. Although some relative horizontal movement between the load cells 12 and the platform 10 can take place, the construction of the struts is such that no forces, resulting from such horizontal movements are transmitted to the load cells.

The weighbridge also includes suitable electrical equipment for interpreting and indicating signals received from the load cells. It will further be appreciated that the application of grease to the struts is used to adjust the level of the platform.

The construction of weighbridge shown in FIGURES 5, 6 and 7 has a platform 50 formed from steel girders with concrete slabs, instead of cast concrete and this platform is supported in a pit 51 on four load cells 52. As in the previously described construction, there are restraining members 53 and 54 for preventing horizontal movements of the platform relative to the pit in two mutually transverse directions.

All the restraining members 53 and 54 are of similar construction and each comprises a pair of rods 55 which are screw-threaded at one end to engage with an internally screw-threaded sleeve 56, there being lock nuts 57 to hold the rods in any adjusted position. The opposite ends of the rods 55 are pivotally connected to the platform 50 and to a bracket 58 fixed to the floor of the pit 51, respectively.

As in the previously described construction, the members 53 and 54 are arranged in pairs, the arrangement including one of each pair connected between the platform 50 and the wall of the pit 51 whilst the other is connected between the platform and a bracket fixed to the pit floor.

To transmit loads on the platform 50 to the load cells 52 there are four struts 59 each comprises a rod 60 having a part-spherical upper end 61 which engaged with a flat plate 62 secured to a girder of the platform 50 and at the lower end of the rod, its flat end is disposed within a sleeve 63 and engaging on a domed upper end portion of a block 64 on the load cell 52.

The struts may, if desired, include damping means, in any convenient form, for restricting the transmission of sudden loads from the platform to the load cells respectively.

Having thus described my invention what I claim as new and desire to secure by Letters Patent is:

1. Electrical weighing apparatus comprising fixed structure, a load carrying member, at least one load cell on which said member is supported on the fixed structure, said load cell producing an electrical signal related to the magnitude of a load on the load carrying member, restraining members respectively restraining horizontal movement of the load carrying member relatively to the fixed structure in two mutually transverse directions, at least one restraining member for restraining movement in one of said directions being disposed near one end of the load carrying member, and means whereby relative horizontal movement between the load carrying member and the load cell can take place, each restraining member comprising a rod carrying at one end a piston engageable in a cylinder, the cylinder defining a space between its end and the piston which is filled with a fluid, and means being provided for filling the spaces in the respective cylinders to adjust the relative positions of the load carrying member and the fixed structure in an horizontal plane.

2. Electrical weighing apparatus comprising fixed structure, a load carrying member, at least one load cell on which said member is supported on the fixed structure, said load cell producing an electrical signal related to the magnitude of a load on the load carrying member, a strut disposed between the load carrying member and the load cell, so as to permit of relative horizontal movement therebetween, a piston on the strut engageable in a cylinder in the load carrying member, said cylinder defining a space between its end and the piston which is filled with a fluid, and means being provided for filling said space to adjust the level of the load carrying member relatively to the fixed structure, restraining members respectively restraining horizontal movement of the load carrying member relatively to the fixed structure in two mutually transverse directions, at least one restraining member for restraining movement in one of said directions being disposed near one end of the load carrying member.

3. Electrical weighing apparatus as claimed in claim 2 in which the strut includes a domed portion engageable with a substantially flat surface on a further part thereof.

4. Electrical weighing apparatus as claimed in claim 2 in which the strut incorporates damping means restricting the transmission of loads applied at a rate above the predetermined value to the load carrying member.

5. Apparatus for transmitting loads from a member to the top of the load cell comprising a strut, means on said strut for permitting relative horizontal movement between the load cell and the member, the strut carrying a piston at its upper end engageable in a cylinder, said cylinder defining a space between its end and the piston which is filled with a fluid, and means being provided for filling said space to adjust the level of the load carrying member relatively to the fixed structure.

References Cited by the Examiner

UNITED STATES PATENTS

| | | | |
|---|---|---|---|
| 2,652,241 | 9/1953 | Williams | 177—208 |
| 2,670,195 | 2/1954 | Baker | 177—211 |
| 2,716,547 | 8/1955 | Thruston | 177—134 X |
| 2,868,570 | 1/1959 | Hines et al. | 177—211 X |
| 2,716,547 | 8/1955 | Thurston | 177—134 X |
| 2,998,090 | 8/1961 | Watson | 177—211 |
| 3,123,166 | 3/1964 | Schellentrager | 177—211 |
| 3,158,217 | 11/1964 | Johnson | 177—154 X |

LOUIS J. CAPOZI, *Primary Examiner.*

LEO SMILOW, G. J. PORTER, *Assistant Examiners.*